(12) United States Patent
Perez et al.

(10) Patent No.: US 11,605,042 B1
(45) Date of Patent: Mar. 14, 2023

(54) ARTIFICIAL INTELLIGENCE SYSTEM FOR CONTENT PRESENTATION IMPACT ESTIMATION

(71) Applicant: Amazon Technologies, Inc., Seattle, WA (US)

(72) Inventors: Omri Perez, Seattle, WA (US); Chirag Mandaviya, Bellevue, WA (US); Duo Cao, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 158 days.

(21) Appl. No.: 17/100,643

(22) Filed: Nov. 20, 2020

(51) Int. Cl.
*G06Q 30/02* (2012.01)
*G06Q 10/0637* (2023.01)
(Continued)

(52) U.S. Cl.
CPC ....... *G06Q 10/06375* (2013.01); *G06F 9/451* (2018.02); *G06N 3/04* (2013.01); *G06N 3/08* (2013.01); *G06Q 20/127* (2013.01); *G06Q 30/0201* (2013.01); *G06Q 30/0202* (2013.01); *G06Q 30/0242* (2013.01); *G06Q 30/0255* (2013.01); *G06Q 30/0603* (2013.01);
(Continued)

(58) Field of Classification Search
CPC .............. G06Q 30/02; G06Q 30/0207; G06Q 30/0254; G06Q 10/067; G06Q 30/0246; G06Q 10/06375; G06Q 20/127; G06Q 30/0201; G06Q 30/0202; G06Q 30/0242; G06Q 30/0255; G06Q 30/0603; G06Q 50/01; G06Q 30/0236; G06Q 30/0239; G06Q 30/0277; G06F 9/451; G06N 3/04; G06N 3/08
See application file for complete search history.

(56) References Cited

U.S. PATENT DOCUMENTS

| | | | |
|---|---|---|---|
| 10,614,381 B2* | 4/2020 | Hoffman | G06N 20/00 |
| 2016/0117330 A1* | 4/2016 | Nash | G06Q 30/0256 |
| | | | 707/723 |
| 2018/0084078 A1* | 3/2018 | Yan | H04L 67/02 |

FOREIGN PATENT DOCUMENTS

| | | | | | |
|---|---|---|---|---|---|
| CN | 111095330 A | * | 5/2020 | | G06N 5/00 |
| JP | 2002-511666 A | * | 4/2002 | | H04N 5/76 |

OTHER PUBLICATIONS

Hessey, S.; Matthews, I., How can recommendations be presented to TV viewers? (English), 2010 14th International Conference on Intelligence in Next Generation Networks pp. 1-6), Oct. 1, 2010 (Year: 2010).*

(Continued)

*Primary Examiner* — Marilyn G Macasiano
(74) *Attorney, Agent, or Firm* — Robert C. Kowert; Kowert, Hood, Munyon, Rankin & Goetzel, P.C.

(57) ABSTRACT

Interaction data sets of consumers of an offering set with an application associated with an offering set are obtained. At least some of the interactions are associated with respective content presentation operations. A neural network model is trained, using the interaction data sets, to generate predictions of actions of a consumer at whom a set of content presentation operations is directed, and to provide action-attribution scores for the content presentation operations. The model includes convolutional layers and an attention module. Weights learned in the attention module are used to estimate the action-attribution scores. A trained version of the model is stored.

20 Claims, 10 Drawing Sheets

(51) Int. Cl.

| | |
|---|---|
| *G06Q 30/0201* | (2023.01) |
| *G06Q 50/00* | (2012.01) |
| *G06Q 30/0601* | (2023.01) |
| *G06Q 20/12* | (2012.01) |
| *G06F 9/451* | (2018.01) |
| *G06N 3/08* | (2023.01) |
| *G06N 3/04* | (2023.01) |
| *G06Q 30/0202* | (2023.01) |
| *G06Q 30/0242* | (2023.01) |
| *G06Q 30/0251* | (2023.01) |
| *G06Q 30/0241* | (2023.01) |
| *G06Q 30/0207* | (2023.01) |

(52) U.S. Cl.
CPC ......... *G06Q 50/01* (2013.01); *G06Q 30/0236* (2013.01); *G06Q 30/0239* (2013.01); *G06Q 30/0277* (2013.01)

(56) References Cited

OTHER PUBLICATIONS

Panaggio,M.J.;Fok,PW;Bhatt,GS;Burhoe,S;Capps,M;Edholm,CJ;Moustaid,FE;Emerson,T;Estock,SL;Gold,N;Halabi,R;Houser,M;Kramer,PR;Lee,HW;Li,Q;Li,W;Lu,D;Qian,Y;Rossi,LF;Shutt,D;Yang,VC;Zhou,Y, Prediction and Optimal Scheduling of Ads in Linear Tel. Aug. 25, 2016 (Year: 2016).*

Xuhui Shao, et al., "Data-driven Multi-touch Attribution Models", ACM, KDD'11, Aug. 21-24, 2011, pp. 258-264.

Wendi Ji, et al., "Additional Multi-Touch Attribution for Online Advertising", Proceedings of the Thirty-First AAA1 Conference on Artificial Intelligence (AAAI-17), 2017, pp. 1360-1366.

Ya Zhang, et al., "Multi-Touch Attribution in Online Advertising with Survival Theory", 2014 IEEE International Conference on Data Mining, 2014, pp. 687-696.

Ning Li, et al., "Deep Neural Net with Attention for Multi-channel Multi-touch Attribution", arXiv:1809.02230v1, Sep. 2018, pp. 1-6.

Paul R. Rosenbaum, et al., "The central role of the propensity score in observational studies fro causal effects", Biometrika, 70, 1, 1983, pp. 41-55.

Donald B. Rubin, "Causal Inference Using Potential Outcomes: Design, Modeling, Decisions", Journal of the American Statistical Association, Mar. 2005, 11, 469; ABI/INFORM Global, pp. 322-331.

Susan Athey, "The Impact of Machine Learning on Economics", In Economics Artificial Intelligence An Agenda, 2018, pp. 507-547.

Paul W. Holland, "Statistics and Causal Inference", Journal of the American Statistical Association, vol. 81, Issue 396, Dec. 1986, pp. 945-960.

Dzmitry Bahdanau, et al, "Neural Machine Translation by Jointly Learning to Align and Translate", arXiv:1409.0473v7, May 19, 2016, Published at ICLR 2015, pp. 1-15.

* cited by examiner

ARTIFICIAL INTELLIGENCE SYSTEM FOR CONTENT PRESENTATION IMPACT ESTIMATION

BACKGROUND

Many organizations conduct substantial portions of their operations over the Internet. For example, physical and virtual stores make their item catalogs accessible via web sites and enable millions of customers to search, browse and view the details of catalog items, information about special events such as promotions and so on via devices such as phones, tablet computing devices, and the like. Educational institutions provide information about classes, professors and the like via the Internet, and conduct many classes at least partly online. Many gyms offer exercise sessions online, enabling their clients to learn about the different types of exercise options available by viewing videos and other types of content before deciding which ones to try.

There may often be a large and diverse set of potential customers for the offerings (e.g., retail catalog items, educational classes, exercise classes and the like) of organizations that conduct operations over the Internet and other networks. In order to meet their objectives, such organizations have to make decisions about how best to convey information about their offerings to customers. A variety of options for content presentation pertaining to the offerings may be available to the organizations via several types of communication channels, such as e-mail, text messages and the like. Each of the content presentation options may have an associate cost.

In order to meet their objectives, the organizations have to make decisions regarding how best to maximize the benefits of content presentation to the customer population. For example, decisions regarding which types of content presentation operations are most effective, which subsets of a diverse customer base should be provided which types of content containing information about the offerings, the scheduling of the presentation of the content, what types of communication channels work best for different customers, and so on may have to be made.

Figure 1:
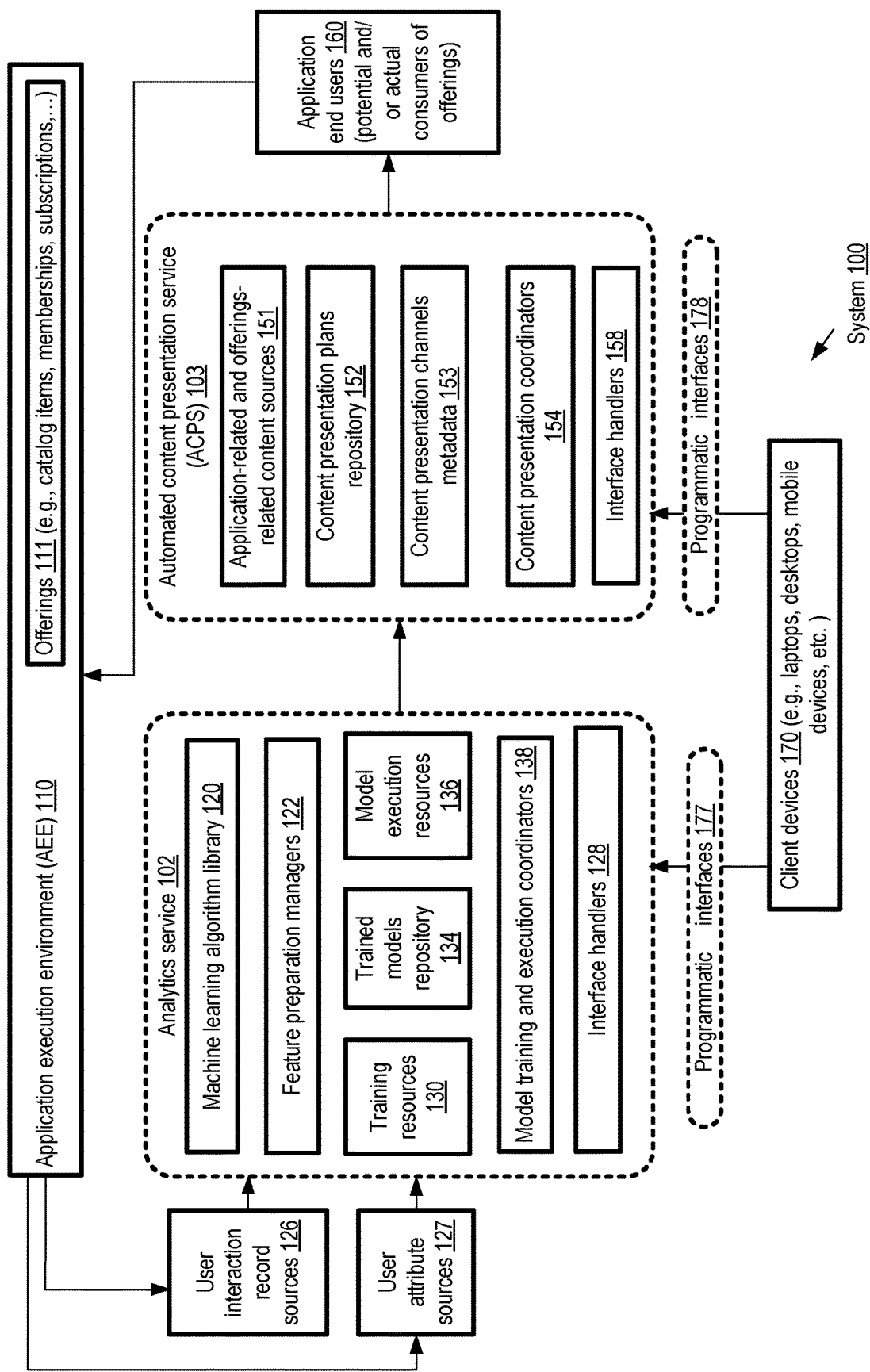
FIG. 1 illustrates an example system environment in which machine learning models using a combination of convolution and attention modules may be utilized to estimate the influence of content presentation operations on offering-related actions of application users, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for data-driven estimation, using a combination of convolutional layers and attention mechanisms of neural networks, of the relative impact of different content presentation operations pertaining to offerings of an organization on the actions of potential customers or consumers of the offerings. Such offerings may include, for example, items available for purchase or rental from a store web site, membership of a user group with an associated set of privileges and benefits (such as free or low-cost delivery of ordered items), subscription to a service (e.g., a service which allows a particular number of movies or television programs to be viewed per month), discounts, enrolments in classes of various kinds, and so on. The types of content which may be provided to individuals or groups in accordance with content presentation plans selected at the organization may include, for example, images, videos, audio items, coupons in paper or electronic form, and so on. Content presentation operations may be performed using a variety of communication channels, including for example e-mails, text messages, social media applications and so on.

A given set of offerings may be accessible via a set of network-accessible applications (e.g., applications associated with one or more web sites), and potential consumers of the offerings may typically interact with resources implementing the applications multiple times before they make decisions regarding the offerings and act upon their decisions (e.g., whether the consumer purchases an item of a store catalog, joins a user group, signs up for a subscription, and so on). Such a sequence of interactions, culminating in a decision and an action, may be referred to as the consumer's "journey". Some of the interactions with the application resources may be organic (i.e., initiated by application users or offerings consumers, without necessarily being triggered by content presentation operations), while other interactions may be responsive to content presentation operations. For example, as part of a content presentation operation, a potential customer of a web store may be provided a web link to a page with information about an offering, and the user interaction responsive to the content presentation operation may comprise a click on the web link. A series of interactions by a user with one or more applications associated with an offering set, including at least some interactions responsive to content presentation operations performed on behalf of the organization on whose behalf the applications are run, may lead to an affirmative user action with respect to the offering set (e.g., a decision to purchase an item or subscription), or may terminate without an affirmative user action (e.g., if the user decides not to purchase any item). In the cases in which an affirmative action is taken by a user after some number of content presentation operations, organizations or individuals providing the offerings may wish to distinguish between the relative impacts of the different content presentation operations—e.g., to determine whether an email was more effective in leading the user to take the affirmative action than a text message, which specific pieces of content or information provided had the most impact on the user, and so on. Such information about the influence of content presentation operations on user actions is also referred to as attribution information. Attribution information may be extremely useful because each content presentation operation usually has a respective cost (e.g., in terms of resources consumed, time spent by content presentation planners, and so on), and determining the most cost-effective content presentation plans is of interest to the organizations providing the offerings.

In many conventional approaches, the attribution of user actions to different content presentation operations is done using heuristics. For example, if a sequence of ten different interactions corresponding to respective content presentation operations was followed by a user action of interest, the first and last (tenth) content presentation operations may be credited with contributing 25% each to the user action, with the remaining eight content presentation operations being credited with an equal share of the remaining 50% (i.e., 6.25% each). Such heuristics can be based on assumptions which may not necessarily be supported strongly by data. In some approaches, linear models may be used to estimate the impact of different types of content presentation operations, which do not take interactions between the different interactions, and which fail to take the relative timing and order of the interactions into account.

In the proposed data-driven approach towards attribution of user actions, a deep neural network-based (DNN) model, which may be referred to as an attribution model, may be employed to overcome such shortcomings. Input to the DNN model may include information about user interactions, collected after obtaining permissions from the users. The DNN model may include a sequence module with multiple convolutional layers with associated filters of varying lengths, as well as an attention module to which the output of the convolutional layers is provided as input. At a high level, the convolutional components may enable efficient learning of salient characteristics of sequences of different numbers of customer interactions (e.g., sequences of length 1, 2, 4, etc.) thus capturing the effects of potential interactions between the interactions, while the attention module may learn weights indicating the relative importance of the different interactions. Generally speaking, attention layers or modules are able to capture relationships between different elements of sequences, regardless of the separation between the elements in the original sequence. The outputs of the model in different embodiments, corresponding to a given input time series representing an interaction sequence of a user, may include for example a predicted action of the user, the timing of the predicted action, and/or the relative influences on the predicted action of different content presentation operations which led to corresponding interactions of the sequence. The use of such a model may thus provide sufficient information about the effectiveness of different content presentation operations to enable content presentation plans to be improved. In at least some embodiments, content presentation plans may be modified automatically based on results obtained from the model.

As one skilled in the art will appreciate in light of this disclosure, certain embodiments may be capable of achieving various advantages, including some or all of the following: (a) substantially reducing the overall amount of computation, storage and networking resources required to optimize content presentation plans associated with organization offerings to achieve specified organizational goals, (b) improving the user experience of customers of the organizations, e.g., by avoiding presentation of content which is likely to be of less interest to the customers, and/or (c) improving the user experience of individuals responsible for analyzing content presentation, e.g., by providing easy to understand customizable graphical views of attribution information.

According to some embodiments, a system may comprise one or more computing devices, e.g., of an analytics service of a provider network or cloud computing environment. The computing devices may include instructions that upon execution on or across the one or more computing devices cause the one or more computing devices to collect respective user interaction data sets of a plurality of users (who have granted permission/authorization for the collection of the data sets) of an application set comprising one or more applications associated with offerings of an organization. The users may represent actual or potential consumers of the offerings, for example. A given user interaction data set of a particular user may comprise (a) a time series of interactions of the particular user with the application set during a selected time interval and (b) a representation of one or more offering-related actions initiated by the particular user after at least some interactions of the time series in various embodiments. At least a subset of the interactions of the particular user represented in the time series may be responsive to respective content presentation operations directed at the user in accordance with a content presentation plan in some embodiments. In one embodiment, at least some of the content presentation operations may comprise advertisements.

A training data set may be prepared from at least the time series and a collection of user attributes or features in various embodiments. Using the training data set, a neural network-based machine learning model whose output comprises (a) a predicted probability of initiation of an action by a user at whom a plurality of content presentation operations are directed and (b) a respective estimated action-influence score associated with individual ones of the plurality of content presentation operations may be trained in some embodiments. In at least one embodiment, the neural network-based machine learning model may comprise at least a sequence module and an attention module. The sequence module may include a plurality of one-dimensional convolutional layers, including for example a first one-dimensional convolution layer with a filter of a first length, and a second one-dimensional convolution layer with a filter of a different length. Output of the sequence module may be provided as input to the attention module, and the respective estimated action-influence influence scores may be based at least in part on learned weights of the attention module in various embodiments.

A trained version of the model may be stored. As desired, the trained version may be used to generate estimated action-influence or action-attribution scores for different content presentation operations associated with user interaction data sets which were not in the training data set. The estimated action-influence scores may be stored and/or presented, e.g., to clients of an analytics service, via one or more programmatic interfaces such as a graphical user interface in some embodiments. In at least one embodiment, one or more automated actions may be initiated in response to the generated estimates of action-influence scores—e.g., a content presentation plan which was going to be used to schedule future content presentation operations (and may have been used to schedule at least some of the content presentation operations which led to the interaction data sets which have been collected) may be modified automatically. Such a modification may, for example, involve increasing the frequency of some types of content presentation operations which were estimated to have a positive impact from the perspective of the offerings provider, changing the order of content presentation operations, eliminating less-effective content presentation operations for at least some time, and so on.

The output obtained from the trained version of the model may be utilized in any combination of several different ways in various embodiments. In one embodiment, for example, an indication of a concrete objective with respect to a set of offerings may be obtained, e.g., via a programmatic interface of the analytics service. Examples of such objectives may include inducing a target number of user actions (e.g., item purchases at a store web site) of a specified type within a specified time period. Based on the objective and the model's output with respect to various user interaction sequences, one or more content presentation operations (CPOs) that should be implemented to help achieve the objective may be identified and then performed. Choices regarding the timing of future CPOs, the respective communication channels to be used for future CPOs, and/or the type of content to be provided in future CPOs may be made with the help of the model in some embodiments. Thus, the model output may be used to determine that after a particular future CPO to a particular user, the next future CPO directed to the user should only be implemented after a particular time interval (e.g., in order to avoid user "fatigue" or overexposure that might result from CPOs that are too closely spaced in time). Output obtained from the model may also be used to determine that after a particular future CPO is implemented using a particular communication channel such as e-mail, the next CPO should preferably be implemented using a different channel (e.g., a push notification) to maximize the probability of desired user action. In one embodiment, the model output may be used to determine that after a particular set of content (e.g., a set of still images) pertaining to an offering has been presented in a particular future CPO, a different set of content (e.g., one or more videos) should preferably be presented in a subsequent CPO.

In at least one embodiment, a procedure for estimating the impact of individual content presentation operations (CPOs) associated with a particular user interaction data set may comprise multiple steps. In one step, using the trained version of the neural network-based model, a cumulative impact of all the CPOs directed to a user during a given time interval may be computed, and in a second step, the cumulative impact may be distributed among the individual CPOs based on the attention module weights. To obtain the cumulative impact, predictions pertaining to two different time series may be obtained and compared in at least some embodiments. A complete time series representing both organic interactions (assumed to be unrelated to specific CPOs) and interactions assumed to be responsive to CPOs may be provided as input to the trained model, and a first prediction pertaining to the complete time series may be obtained from the model. A modified/stripped time series, from which the interactions responsive to the CPOs have been removed, may then be provided as input to the model to obtain a second prediction. The first and second prediction may be provided as input to a function, and output of the function may indicate the estimated cumulative impact of all the CPOs. Indications of the cumulative impact, and/or the subdivision of the cumulative impact into per-CPO components based on the attention weights provided by the trained model, may be provided via programmatic interfaces in some embodiments.

In some embodiments, several types of features may be provided as input to the model during training and/or after training, e.g., in addition to representations of the interaction sequences. For example, in one embodiment, the training data set may comprise, corresponding to a particular interaction of an interaction sequence, an indication of a communication channel associated with the interaction (e.g., the channel used for content presentation to the user (if any), for the response of the user, or both the content presentation and the response). Using the communication channel may include, for example, using one or more of: (a) an e-mail application, (b) a web page link, (c) a social media service, (d) a text messaging application, (e) an automated personal assistant device, (f) a wearable device, or (g) a phone.

In at least one embodiment, after obtaining authorization/permission from the users involved, information about the tools/programs used for the interactions and/or the specifics of content presented in a CPO (or accessed as a result of a CPO) which led to an interaction may be included in the input provided to the model. For example, the training data set may comprise, corresponding to a particular interaction of an interaction sequence, an indication of one or more of: (a) an operating system employed by a user for the interaction, (b) a category of a program utilized by the user for the interaction, selected from a set of categories comprising a mobile application, a web browser, or a host-based application, (c) an indication of a device type utilized by the user for the interaction, or (d) one or more descriptors of the specific content obtained by the user in the interaction or in the associated CPO.

Information about one or more properties of the users may be included in the input provided to the model in various embodiments. Such information, for whose collection permission/authorization is also obtained in advance from the users, may include, for example, one or more of: (a) a membership status of a particular user within one or more user groups associated with the application set linked to the offerings, (b) an indication of how recently the particular user has interacted with one or more web sites associated with the application set, (c) an indication of how frequently the particular user has interacted with one or more web sites associated with the application set during a time period, (d) an indication of a total value of actions initiated by the particular user with respect to the application set during a time period, computed using one or more application-specific algorithms selected by an owner of the application set, or (e) an indication of a duration for which the particular user has interacted with the application set.

According to some embodiments, as suggested earlier, analysis of the kind introduced above pertaining to the estimation of the influence or attributions of CPOs may be performed at a network-accessible analytics service of a provider network, e.g., in response to one or more programmatic requests directed to the analytics service by its clients. The analytics service may obtain permissions from the users for the collection and analysis of information pertaining to their interactions using "opt-in" programmatic interfaces (and/or other types of interfaces) in various embodiments. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as an analytics service (which may also be referred to as a machine learning service). A VCS may also be referred to as an elastic compute service, virtual machines service, computing cloud service, compute engine, and/or cloud compute in various implementations. Programmatic interfaces of the analytics service may be used by clients, for example, to specify various desired parameters and properties of the attribution technique, such as the amount of time over which the user interaction information to be used as input for the models should be collected (e.g., 1 week, 2 weeks, etc.), the maximum number of interaction events to be included in the input, hyperparameters such as the dimensionality of various layers of the model, and so on.

Example System Environment

FIG. 1 illustrates an example system environment in which machine learning models using a combination of convolution and attention modules may be utilized to estimate the influence of content presentation operations on offering-related actions of application users, according to at least some embodiments. As shown, system 100 of FIG. 1 comprises resources and artifacts of an analytics service 102 and an automated content presentation service 103. The analytics service 102 includes a machine learning algorithm library 120, feature preparation managers 122, training resources 130, a trained models repository 134, model execution resources 136, model training and execution coordinators 138 and interface handlers 128. The automated content presentation service (ACPS) 103 comprises application-related and offerings-related content sources 151, a content presentation plans repository 152, metadata 153 pertaining to content presentation channels/programs, one or more content presentation coordinators 154, as well as one or more interface handlers 158. Each of the different subcomponents of analytics service 102 and automated content presentation service 103 may comprise some combination of hardware and software of one or more computing devices in various embodiments.

At a high level, the ACPS 103 may be utilized to orchestrate the presentation of content to end users 160 of a set of applications implemented at an application execution environment (AEE) 110 in the depicted embodiment, while the analytics service 102 may be employed to estimate the relative influence on user actions of the different content presentation actions performed with the help of the ACPS. The AEE 110 may enable application end users 160 to consume (e.g., by initiating web-based transactions) any of a variety of offerings 111 of an organization, such as catalog items of a store, memberships in various user groups and the like with associated benefits, subscriptions to services or other products, and so on. As such, the application end users 160 may comprise potential and/or actual consumers of the offerings 111.

End users 160 may interact with the AEE 110, e.g., via various types of communication channels such as web sites, emails, text messages, social media tools and the like in the depicted embodiments. Such channels may also be used to provide content by the ACPS from content sources 151 to the application end users 160 in at least some embodiments. One or more such channels may be used to obtain permissions/authorizations from the users for the collection and analysis of information pertaining to the users' interactions with the AEE in various embodiments. Metadata 153 may include details such as user email addresses, social media identifiers, text message destination information, etc., pertaining to the content presentation channels, which the ACPS has been granted permission to store (e.g., via opt-in interfaces) by the end users in the depicted embodiment. Information about the resource consumption and other costs associated with CPOs may also be stored in metadata 153 in at least some embodiments.

Records (e.g., log records of various subcomponents of the AEE 110) corresponding to various interactions of the end users with the AEE and/or the offerings 111 may be collected and stored in user interaction record sources 126 in the depicted embodiment. Corresponding to any given end user, a user-specific time series of interactions may be extracted from the record sources. A given time series may include some number of organic interactions (in which for example the user logged on to a web site of the AEE or browsed the web site without necessarily being prompted or encouraged to do so by a CPO), as well as some number of interactions assumed to be associated with, responsive to, or caused/triggered by a CPO in various embodiments. An individual record of a time series may indicate, for example, the communication channel used for the interaction, the operating system and program (e.g., browser, phone app, etc.) used, a time stamp, information about the CPO (if any) with which the interaction is associated, and/or an indication of the specific operation performed by the user in at least some embodiments. In at least some embodiments, one or more of the records of a time series may explicitly or implicitly indicate respective actions initiated or performed by an end user with respect to the AEE, such as purchasing an item included in the offerings 111, signing up for a group membership or a subscription, and so on. The absence of a positive action such as a purchase or a subscription at the end of an interaction sequence or time series may be interpreted as a negative action in at least some embodiments.

Information which may be useful in characterizing the users and therefore in estimating the impact of different CPOs on individual users may be stored in user attribute sources 127 in at least some embodiments. Such attributes may include, for example, respective categories into which individual users have been placed based on how frequently the users have interacted with the AEE (e.g., via a web site or sites implemented at the AEE) during a selected time interval, membership status of the users within one or more user groups associated with the AEE, how recently the users has interacted with the AEE, an estimated total value of actions initiated by the users with respect to the AEE during a time period, and/or a total duration for which the users have interacted with the AEE (e.g., whether the user has accessed a web site of the AEE for several years, a single year, a few months, etc., or has never used the web site). In some embodiments, at least some of the user information accessed from user attribute sources 127 may also be updated based on the interactions of the end users with the AEE 110—for example, a given user's group membership status may change, or the frequency with which the user interacts with the AEE may lead to a reclassification of the user. A user's attribute values may change based on organic interactions and/or based on actions responsive to content presentation operations in various embodiments.

The analytics service 102 may implement a set of programmatic interfaces 177 in the depicted embodiment, such as a web-based console, command-line tools, application programming interfaces (APIs), graphical user interfaces and the like. Similarly, the ACPS 103 may implement its own set of programmatic interfaces 178. Clients of analytics service 102 or ACPS 103 may submit various types of requests, command or messages pertaining to content presentation analysis and management via interfaces 177 or 178 in the depicted embodiment from a variety of client devices 170, such as laptops, desktops, mobile devices and the like, and receive corresponding responses. The requests, commands or messages directed to the analytics service 102 or the ACPS 103 may be received and processed initially by a set of interface handlers 128 or 158 respectively, which may then transmit internal versions of the received messages to other subcomponents of the analytics service to perform the required work and provide results if needed. Note that in some embodiments, the ACPS 103 may be implemented as a subcomponent of the analytics service 102, so a common set of programmatic interfaces may be used for both services.

Initial versions of content presentation plans may be provided by clients via programmatic interfaces 178 to content presentation coordinators 154 of ACPS 103 in some embodiments. Such plans, which may be stored in repository 152, may indicate a baseline set of CPOs to be implemented with respect to various application end users—e.g., the specific channels (about which information is available in metadata 153) to be used to present content to a given user, the timings of such presentations, the actual content (obtained from content sources 151) to be presented, and so on. Such content presentation plans may later be modified in some embodiments based on analysis of the users' responses to the CPOs using a machine learning model which can assign attribution or action-influence scores to different CPOs as discussed below. In addition to submitting initial content presentation plans, clients of the ACPS may also submit requests for content presentation metrics and costs to the ACPS via programmatic interfaces 178 in various embodiments, and receive the requested metrics in response.

In at least some embodiments, clients may submit information about the AEE 110, its offerings 111, and a population of end users 160 to the analytics service via the programmatic interfaces 177. The information may include indications (e.g., network addresses, access credentials etc.) of the user interaction record sources 126 and the user attribute sources 127. In at least one embodiment, a client may submit a request to train a model for predicting actions of users based on sequences of the users' interactions (including interactions responsive to CPOs) and for assigning different CPOs respective influence or attribution scores with respect to the predicted actions. In response to such a training request, a training data set comprising representations of user interaction records and corresponding user-specific features may be prepared, e.g., by a model training and execution coordinator 138 in the depicted embodiment. In one embodiment, a client may provide preferences for various parameters and meta-parameters of the model, such as the time period over which input interaction sequences should be collected for some or all users, the maximum lengths (in terms of number of interactions rather than time) of such sequences, and so on. Using the training data set and an algorithm selected from the library 120, a neural network-based machine learning model may be trained in various embodiments using training resources 130. The model may comprise at least a sequence module and an attention module in some embodiments. The sequence module may include a plurality of one-dimensional convolutional layers in at least some embodiments, including a first one-dimensional convolution layer with a filter of a first length, and a second one-dimensional convolution layer with a filter of a different length. Output of the sequence module may be included in the input provided to the attention module, and respective estimated action-influence scores or attribution scores may be assigned to different CPOs for which corresponding interactions are included in an input interaction sequence based at least in part on learned weights of the attention module.

A trained version of the model may be stored in repository 134 in the depicted embodiment. As and when desired, e.g., in response to additional programmatic requests from clients, the trained version of the model may be run by model training and execution coordinators 138 on one or more input interaction sequences. The results produced by the trained version of the model may be employed in various ways in different embodiments. For example, predicted actions and respective action-influencing scores assigned to individual CPOs associated with the input interaction sequence may be provided via programmatic interfaces 177 to clients or via programmatic interfaces 178 to content presentation coordinators 154 responsible for implementing content presentation plans in some embodiments. As mentioned earlier, the content presentation coordinators 154 may have been provided initial versions of content presentation plans by clients via programmatic interfaces 178 in some embodiments, and such plans may be modified based on the learned information about the influence of different CPOs. For example, the frequency of CPOs which have more influence on positive actions of a certain type of user may be increased for that type of user, the frequency of CPOs which have not had much positive influence may be reduced, and so on.

Graphical user interfaces may be used to present customizable representations of the action-influence scores in at least some embodiments, enabling clients of the analytics service to easily identify how beneficial different types of CPOs are for different types of users, how the sequencing and timing of different CPOs influences user decisions regarding actions, and so on. The cumulative impact of all the CPOs associated with interactions of an interaction sequence may be computed or estimated in some embodiments, e.g., by providing two versions of the sequence as input to the trained version—one version with all the interactions included, and one version with the CPO-responsive interactions excluded. The cumulative impact may be presented vie the programmatic interfaces 177 or 178 in at least some embodiments in addition to an indication of the predicted action and the per-CPO attribution scores. In at least one embodiment, in addition to predicting the type of action which the user is likely to take after a sequence of interactions, the trained model may also predict the timing of the predicted action.

Example Interaction Sequence

Figure 2:
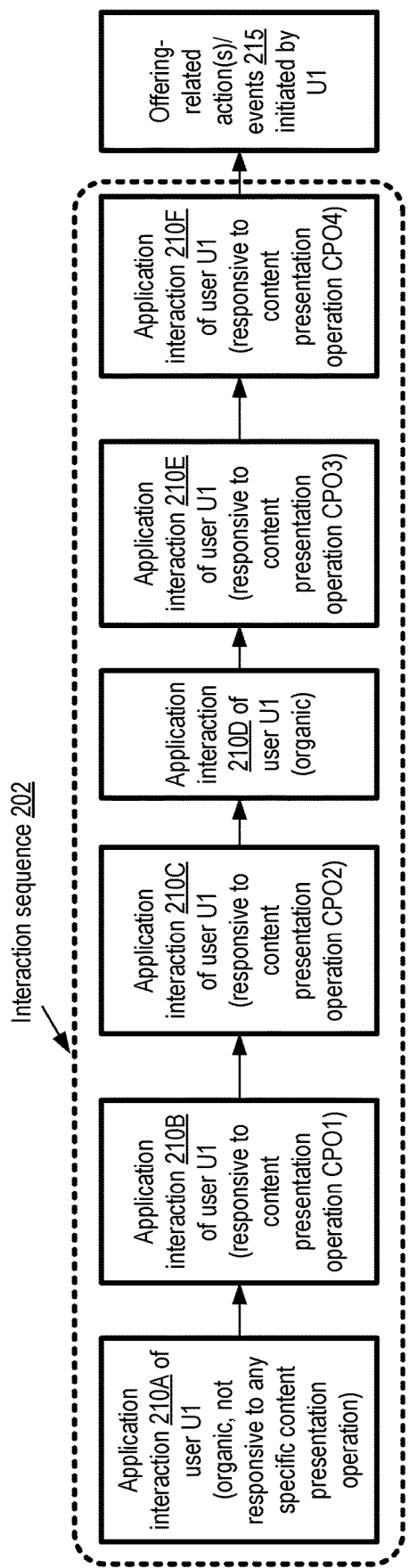
FIG. 2 illustrates an example interaction sequence of a user, culminating in an action, and example questions which may be answered with respect to the interaction sequence with the help of machine learning models, according to at least some embodiments.

FIG. 2 illustrates an example interaction sequence of a user, culminating in an action, and example questions which may be answered with respect to the interaction sequence with the help of machine learning models, according to at least some embodiments. A interaction sequence 202 of seven interactions of a user U1 with an application set run at an application execution environment similar to AEE 110 of FIG. 1 is shown, culminating in offering-related action(s)/events 215 initiated by U1. Records representing the interactions of sequence 202 may be captured, e.g., at various logs or monitoring tools, over some selected time period (such as a week or two weeks). In the depicted example, application interactions 210A and 210D of the user U1 are organic, in that they are not tied to any particular content presentation operation (CPO) initiated on behalf of the organization whose offerings are accessible via the application interactions. In contrast, application interactions 210B, 210C 210E and 210F are assumed to be responsive to respective content presentation operations CPO1, CPO2, CPO3 and CPO4. The evidence of the causation between CPOs and interactions may be very clear in at least some cases—e.g., if a CPO comprise an email with a particular web link uniquely created for the email, and the next interaction 210 of U1 is a click on that web link, then the relationship of the CPO to the action is evident. In other cases, the application interaction may be assumed to be responsive to a CPO if the interaction occurs shortly after the CPO. The CPOs may have been initiated based on a particular version of a content presentation plan of the kind discussed above in the context of FIG. 1.

From the perspective of the organization providing the offerings, a number of questions 220 pertaining to interaction sequence 202 may need to be answered. For example, as shown in element 222, is there a data-driven way to estimate the relative influence of the different CPOs (and the communication channels used)? As shown in element 224, does the sequencing/interaction of CPOs (such as CPO1, CPO2, CPO3 and CPO4) matter, and if so, how much does it matter? Does the timing of CPOs (the inter-CPO intervals) matter, and if so, how much does it matter, as indicated in element 226? Some conventional approaches towards attributing user actions to CPOs may rely on arbitrary heuristics, such as assuming that the very last CPO (CPO4 in the depicted example) or the very first CPO (CPO1) is more important than other CPOs of the sequence, without any evidence for such attributions. Some conventional techniques use linear models, which do not take possible ordering-based relationships between the CPOs (and associated user interactions) into account, and tend to ignore the timings of CPOs. In contrast to such conventional techniques, in the approach introduced above involving the use of convolutional layers with varying filter sizes and an attention module, ordering and timing information, as well as representations of user attributes and interaction-specific tools and programs, may all be used to derive data-driven conclusions regarding the relative influence of the different CPOs.

Example Machine Learning Model

Figure 3:
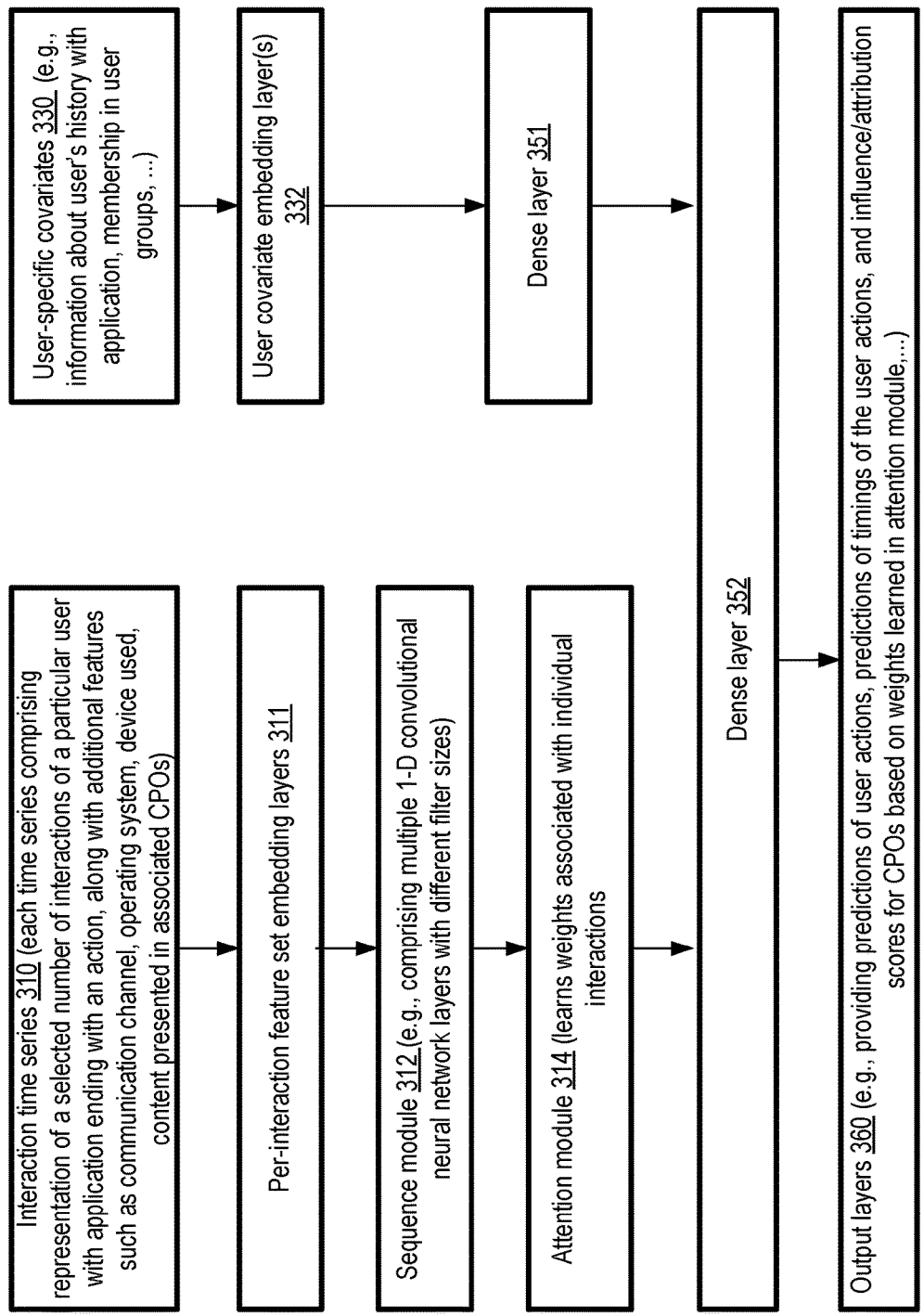
FIG. 3 illustrates an architecture of an example machine learning model for predicting the influence of content presentation operations on user actions, according to at least some embodiments.

FIG. 3 illustrates an architecture of an example machine learning model for predicting the influence of content presentation operations on user actions, according to at least some embodiments. Such a model may also be referred to as an attribution model. At least two types of input are provided to the model in the depicted embodiment: per-user interaction time series 310, as well as per-user or user-specific covariates 330. Permissions/authorizations to collect and analyze the data used for the model inputs may be obtained from the users using a variety of interfaces and mechanisms in different embodiments. A given user interaction time series 310 may include a representation of some number of interactions of a particular user with an application set (e.g., one or more web sites) run at an application execution environment similar to AEE 110 of FIG. 1, including an indication of a user action or actions pertaining to the application set and associated offerings subsequent to the interactions. For individual interactions, associated timestamps or sequence numbers may be represented in the input, along with additional features representing, for example, the kind of communication channel utilized by the user, the device utilized by the user, the specific content accessed by or presented to the user, and/or information about the associated content presentation operations (CPOs) (if any) which led to or resulted in the user interaction may be included in the input in at least some embodiments. In at least some cases, a CPO may use the same communication channel as the user's response to the CPO, so information about the channel utilized by the user may indicate the channel utilized by the CPO. In other cases, separate channels may be used for presenting content to the user, and by the user for responding to the content; in such scenarios, information about both channels may be included in the input. Of course, some of the user's interactions may be organic as discussed above, in which case there would be no CPO associated with the interaction. User-specific covariates 330 may include, for example, information about the user's history with the applications implemented at the AEE, membership in user groups, etc. Each user may be placed in a particular class of users based on analysis of the user's history with the application set in some embodiments, and such class information may be included in the user-specific covariates.

At least some of the features associated with the time series records may be converted or transformed into respective vector embeddings in per-interaction feature set embedding layers 311 of the model in the depicted embodiment. Similarly, at least some of the user-specific covariates 330 may also be converted/transformed into corresponding vector embeddings in user covariate embedding layers 332. Note that embedding representations of some of the features of the interaction time series and/or the user covariates need not be learned or generated in at least some embodiments.

The per-interaction features or associated embeddings may be provided as input to a sequence module 312 in the depicted embodiment. Such a sequence module may, for example, comprise multiple one-dimensional convolutional neural network layers with differing sizes of convolution filters in some embodiments, as discussed in further detail below with respect to FIG. 4. The different sizes of filters may help the model to learn about relationships among multiple user interactions and/or the impact of the ordering of the interactions in at least some embodiments. Intermediate output (e.g., internal representations of each of the interactions of the interaction sequence) produced by the sequence module 312 may be provided as input to an attention module 314. The learned weights of the attention module may indicate the respective impact or influence of each of the interactions of the input interaction sequence on the action(s) taken by the user.

The output produced by the attention module 314 may be combined with the output produced by the user covariate embedding layers in various embodiments. In the embodiment depicted in FIG. 3, the user covariate embeddings may be passed through dense neural network layer 351, and then the output of the dense layer 351 may be passed as input to another dense layer 352 along with the output of the attention layer. The output layers 360 of the model may provide, for example, probabilistic predictions of the next user action expected after the input interaction sequence, predictions of the timings of such actions, as well as influence/attribution scores for CPOs associated with interactions of the input interaction sequence.

Figure 4:
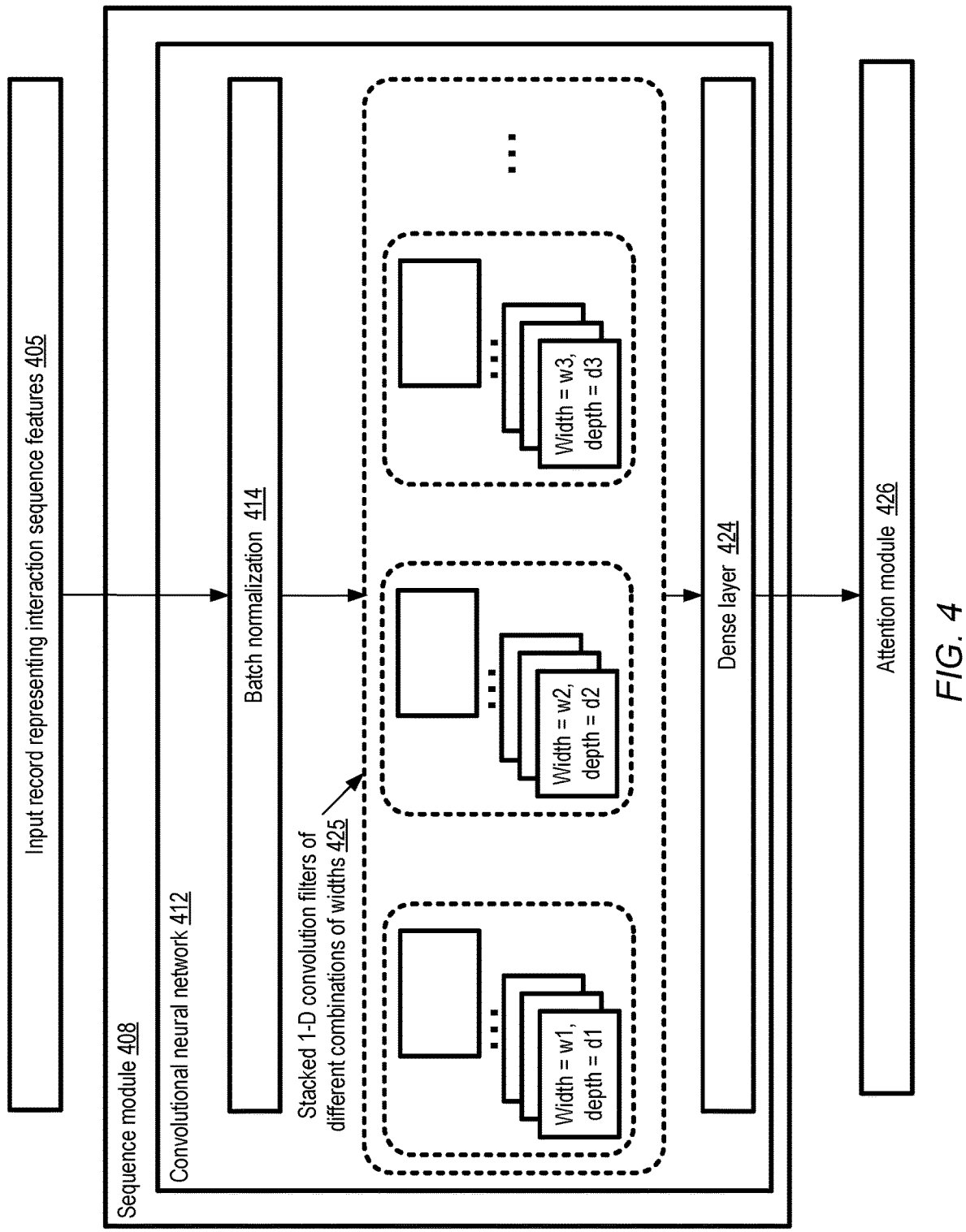
FIG. 4 illustrates an example sequence module of a machine learning model used for action-influence predictions, according to at least some embodiments.

FIG. 4 illustrates an example sequence module of a machine learning model used for action-influence predictions, according to at least some embodiments. Sequence module 408 comprises a convolutional neural network (CNN) 412 in the depicted embodiment. Batch normalization 414 is applied to the input record 405 representing interaction sequence features, e.g., to reduce edge effects by ensuring that the batch mean of input features is zero.

The normalized input may then be provided to a collection of stacked one-dimensional convolution filters 425 with several different filter widths (and different stack depths). For example, one of stacks may have a width w1 and a depth d1, another may have a width w2 and a depth d2, a third may have a width s3 and a depth d3, etc. The width of a filter of a convolution layer may represent the number of consecutive events of the input event sequence on which convolution is applied in the filter. As such, by using filters of different widths, the salient characteristics of sequences of the corresponding number of consecutive events may be learned in the model. The depths of the stacks may decrease as the filter widths are increased in some embodiments. The output of the filter stacks may be provided as input to a dense layer 424 in the depicted embodiment, and the output of the dense layer may be sent to the attention module 426. In at least some embodiments, the analytics service may comprise an automated hyper-parameter tuning tool which is employed to determine values for hyper-parameters such as the number of distinct filter stacks, the combinations of filter widths and depths, and so on. In some embodiments, convolutional layers with different internal architecture than that shown in FIG. 4 may be used—e.g., filter stacks of differing widths may not necessarily be employed. In at least one embodiment, a sequence module which does not utilize convolution but is still able to efficiently capture relationships between different interactions may be used.

Example Multi-Step Technique for Estimating Cumulative and Per-CPU Impact

Figure 5:
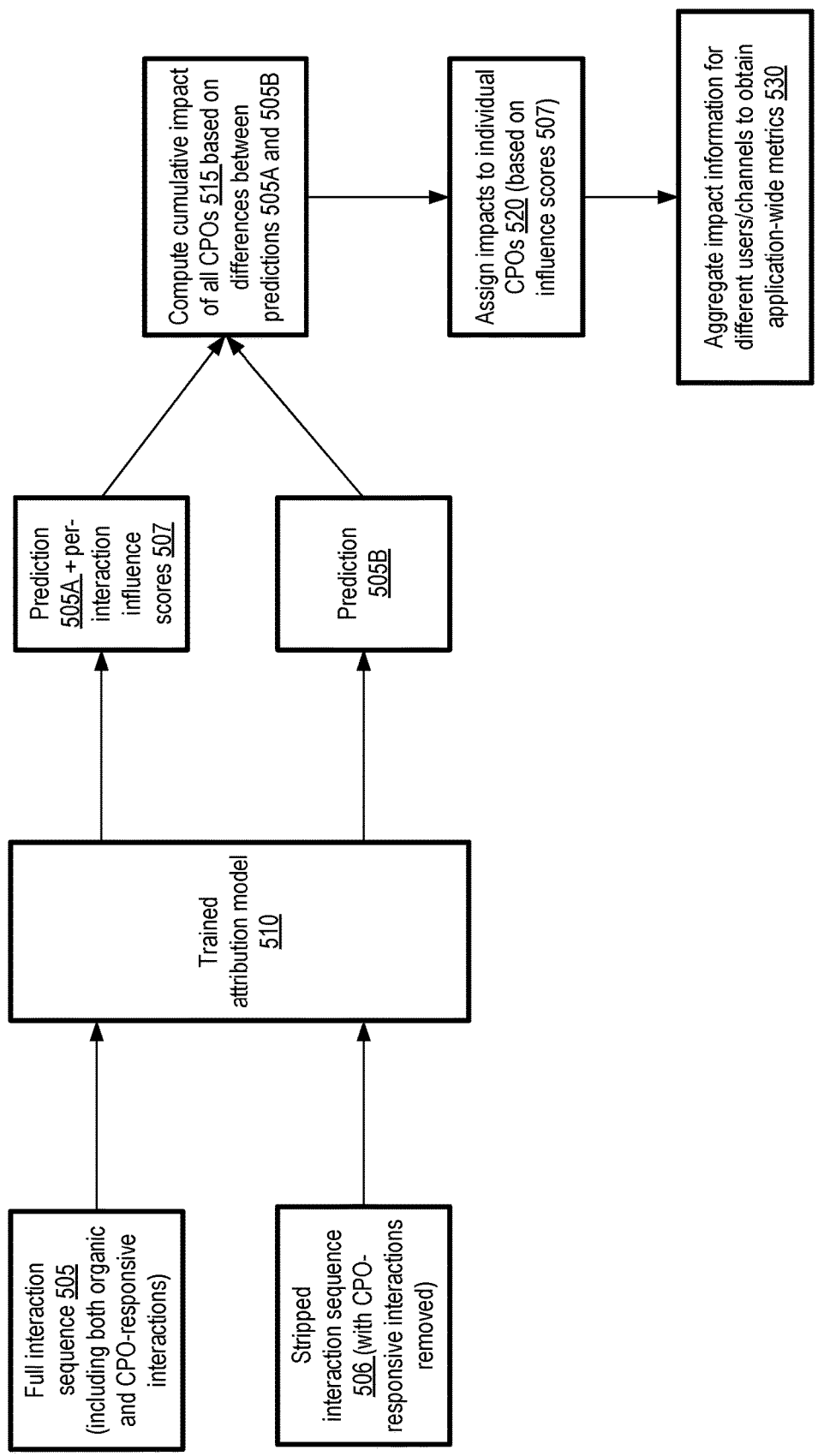
FIG. 5 illustrates an example multi-step technique for estimating the impact of individual content presentation operations on a user action, according to at least some embodiments.

FIG. 5 illustrates an example multi-step technique for estimating the impact of individual content presentation operations on a user action, according to at least some embodiments. A full interaction sequence 505, comprising one or more organic interactions as well one or more CPO-responsive interactions, may be provided as input to a trained version of an attribution model of the kind discussed in the context of FIG. 3 in the depicted embodiment, and a corresponding prediction 505A along with per-interaction influence scores 507 may be obtained from the trained model. A stripped version 506 of the interaction sequence, with the interactions response to CPOs removed or stripped, may also be provided (in a separate step) to the trained attribution model 510, and a second prediction 505B may be obtained for the stripped sequence.

A cumulative impact 515 of all the CPOs for which interactions are included in the full interaction sequence 505 may be computed based on the differences between predictions 505A and 505B (since prediction 505A includes the impact of the CPOs, while prediction 505B does not). If, for example, the predicted probability of a positive user action indicated in prediction 505A is p_full, and the predicted probability of the same positive user action in prediction 505B is p_stripped, and assuming that p_stripped is less than p_full, the impact of all the CPOs may be proportional to (p_full−p_stripped)/(p_full). This ratio may then be multiplied with an observed value metric (such as the purchase price of an item whose purchase corresponds to the positive user action) to obtain the cumulative impact of all the CPOs in some embodiments.

Having computed the cumulative impact, impact metrics may be assigned to the individual CPOs based on the per-interaction influence scores 507 obtained using the full interaction sequence, as indicated in element 520. For example, if the full interaction sequence 505 comprises 3 CPOs, CPO1, CPO2 and CPO3 to which influence scores 0.1, 0.2 and 0.2 were assigned (e.g., on a scale from 0 to 1) respectively, and the cumulative impact of all 3 CPOs was estimated as $100, then the respective per-CPO impact may be estimated as $20 for CPO1, $40 for CPO2 and $40 for CPO3. Such impact estimates may be aggregated for different users and for different channels to obtain application-wide influence/impact metrics in some embodiments, as indicated in element 530. For example, CPO1 may have been performed using an email channel, CPO2 via a text message channel and CPO3 via a social media tool. In such a scenario, impact estimates for all the email channels and all the users to whom content was presented using email may be aggregated to determine the overall benefit of using emails for CPOs, impact estimates for all the text-message channels and all the users to whom content was presented using text messages may be aggregated to determine the overall benefit of using text messages for CPOs, and impact estimates for all the social media tool channels and all the users to whom content was presented using the social media tool may be aggregated to determine the overall benefit of using the social media tool for CPOs.

Example Programmatic Interactions

Figure 6:
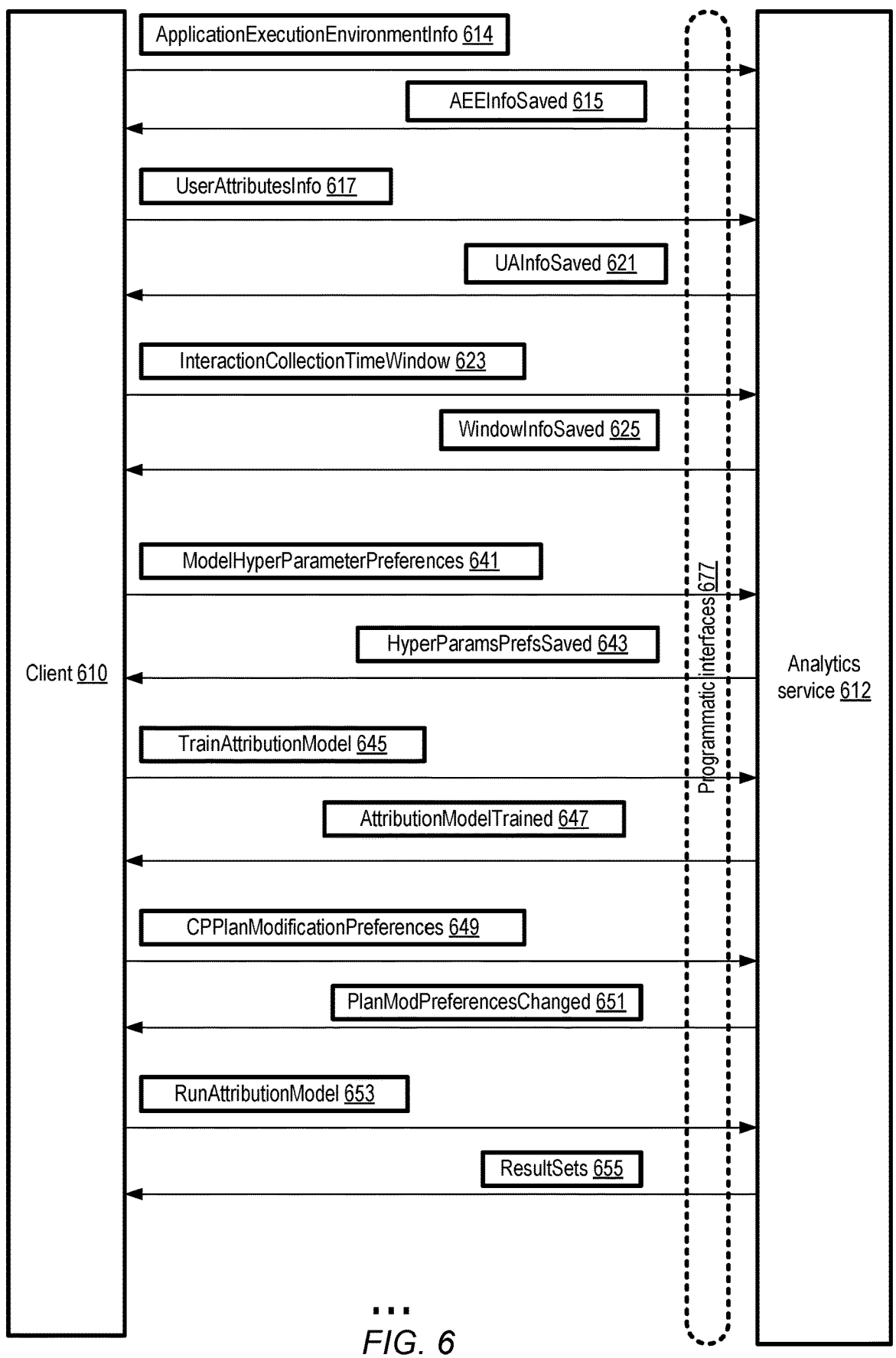
FIG. 6 illustrates example programmatic interactions pertaining to content presentation impact estimation, according to at least some embodiments.

FIG. 6 illustrates example programmatic interactions pertaining to content presentation impact estimation, according to at least some embodiments. In the embodiment depicted in FIG. 6, an analytics service 612 similar in functionality to analytics service 102 of FIG. 1 may implement one or more programmatic interfaces 677, such as a web-based console, command-line tools, graphical user interfaces, APIs and the like. Using an ApplicationExecutionEnvironmentInfo message 614 sent via the programmatic interfaces 677, a client 610 of the analytics service may provide data about the application execution environment (AEE) for which the impact of various content presentation operations (CPOs) on user actions is to be determined. Such information may, for example, include an indication of one or more web sites used for application run at the AEE, a set of offerings (e.g., items of a catalog, subscriptions to various services or products to be provided periodically, memberships in user groups with associated benefits, etc.) available to end users via the AEE, sources (such as log files) of user interaction records, the set of CPO channels to be considered in the analysis, and so on. The provided AEE information may be stored at a repository of the analytics service in the depicted embodiment, and an AEEInfoSaved message 615 may be sent to the client.

A UserAttributesInfo message 617 may be sent to the analytics service 612 to indicate sources (e.g., customer databases) from which information about the user population of the AEE can be extracted. The attributes for a given user may include, for example, respective categories into which the user has been placed based on factors such as (a) a current or past membership status of the given user within one or more user groups associated with an application run at the AEE, (b) an indication of how recently the given user has interacted with one or more web sites associated with the AEE, (c) an indication of how frequently the given user has interacted with one or more web sites associated with the AEE during a time period, (c) an indication of a total value of actions initiated by the given user with respect to the application during a time period or (d) an indication of a duration for which the given user has interacted with the application (e.g., for how many months or years the given user has accessed a web site of the AEE). The user attributes information may be stored at a repository of the analytics service in the depicted embodiment, and a UAInfoSaved message 621 may be sent as an acknowledgement to the client 610.

In at least some embodiments, a client may indicate the time window over which the time series of user interactions are to be collected to train a machine learning model for predicting attributions/impacts of CPOs, e.g., via an InteractionCollectionTimeWindow message 623. In some embodiments, instead of or in addition to the time windows to be used for collecting user interactions for training the model (and/or for executing the model after it has been trained), a client 610 may indicate a count of interactions to be collected. For example, the client may indicate that all the user interactions which occurred within a particular two-week window should be collected, subject to a maximum of 50 interactions. The information about the window or interaction count may be stored at the analytics service 612, and a WindowInfoSaved messages 625 may be sent to the client in some embodiments.

A ModelHyperParameterPreferences message 641 may be sent by a client to indicate preferred values of one or more hyper-parameters of the attribution model in some embodiments, such as the sizes of CNN filters and the depths of the filter stacks, the dimensionality of various other layers of the model, details of the loss function to be used, and so on. A HyperParamsPrefsSaved message 643 may be sent to the client are the preferences are saved at the analytics service.

In various embodiments, a TrainAttributionModel request 645 may be submitted by a client to initiate the training (or retraining) of a machine learning model of the kind discussed above in the context of FIG. 3. In response, the training of the model may be initiated, and an AttributionModelTrained message 647 may be sent to the client to indicate when the model has been trained and stored. In at least some embodiments, the attribution model may be retrained periodically (e.g., once every D days, where D is a parameter provided by the client or selected by the analytics service) as records of additional customer interactions become available, as content presentation plans are modified based on the attribution predictions generated by earlier versions of the model, and so on.

According to one embodiment, a client 610 may provide guidance regarding how content presentation plans are to be modified based on the results obtained from the model, e.g., in one or more CPPlanModificationPreferences messages 649. Such a message may indicate, for example, attribution score thresholds for determining when to stop using a particular channel used for CPOs with respect to a given user, when to increase the frequency of CPOs for a given user, and so on. The provided preferences regarding content presentation may be stored (and/or provided to content presentation coordinators similar to those shown in FIG. 1) in such an embodiment, and a PlanModPreferencesChanged message 651 may be sent to the client.

A client may submit a RunAttributionModel request 653 to execute the attribution model, e.g., using a specified set of user interaction sequences as input in the depicted embodiment. The request 653 may indicate the kinds of results to be provided to the client (and/or to other recipients such as content presentation coordinators), such as attribution scores of different CPOs, cumulative impact metrics for different channels, and so on. The trained version of the model may be executed at the analytics service 612, and the results requested may be provided via one or more ResultSets messages 655 in the depicted embodiment.

Figure 7:
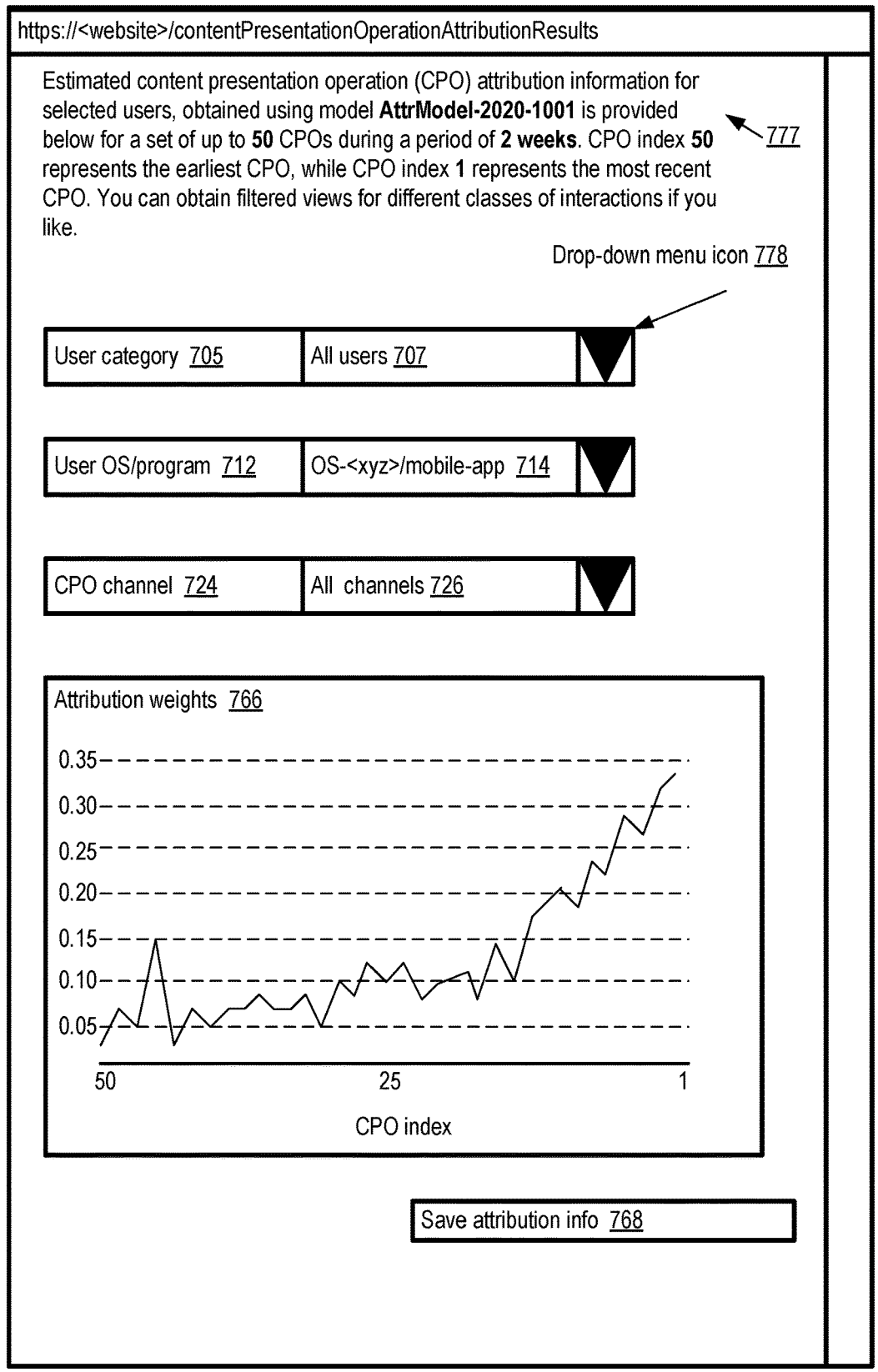
FIG. 7 illustrates an example graphical user interface which may be used to present customized views of estimated impacts of content presentation operations, according to at least some embodiments.

FIG. 7 illustrates an example graphical user interface which may be used to present customized views of estimated impacts of content presentation operations, according to at least some embodiments. As shown, a web-based interface 702 may be implemented by an analytics service similar in functionality to analytics service 102 of FIG. 1 to provide visualizations of attribution weights or scores. The web-based interface 702 may comprise an introductory message area 777 in which an overview of the information provided using the rest of the web page may be presented. The viewer may also be advised that filtered or customized views of the data produced with the help of an attribution model of the kind discussed in the context can be obtained if desired.

Web-based interface 702 may indicate a number of filtering options in the depicted embodiment. For example, web-based interface 702 viewers may filter the attribution results by user category 705, user OS/program 712 (the operating system or program type (e.g., phone-based app versus desktop browser) utilized by the user for interactions associated with CPOs, and/or the CPO channel 724 (the communication channel used for the CPO and/or the user's response to the CPO) in the depicted embodiment. In the example scenario shown, the user category "All users" 707 has been selected, and a drop down menu listing available options for user categories can be accessed via drop-down menu icon 778. Similar drop-down menus may be accessed for the user OS/program combination (for which "OS-<xyz>/mobile-app" 714 is shown selected) and the CPO channel (for which the option "All channels 726" is shown currently selected).

An attribution weights graph 766, indicating the relative importance or influence of fifty interactions (based on results obtained from the trained attribution model) indexed 50 to 1 (with index 1 assigned to the final analyzed interaction of the sequence of 50, and index 50 assigned to the first analyzed interaction) is presented in web-based interface 702 in the depicted embodiment. The Y-axis represents the attribution weights (real numbers between 0 and 1 in the depicted example) and the X-axis corresponds to the interaction index. In the example shown, the relative importance remains relatively flat over the first 25-30 interactions and then increases towards the end of the sequence. Viewers of web-based interface 702 may store a representation of the displayed attribution information using the "save attribution info" element 768.

In at least one embodiment, combinations of programmatic interactions other than those shown in FIG. 6 and FIG. 7 may be supported for attribution analysis. For example, in some embodiments a client 610 may not necessarily provide guidance about model hyper-parameters; instead, the analytics service may choose the model hyper-parameters on behalf of the client. In at least one embodiments, some of the types of programmatic interactions shown in FIG. 6 may not be supported.

Example Provider Network

Figure 8:
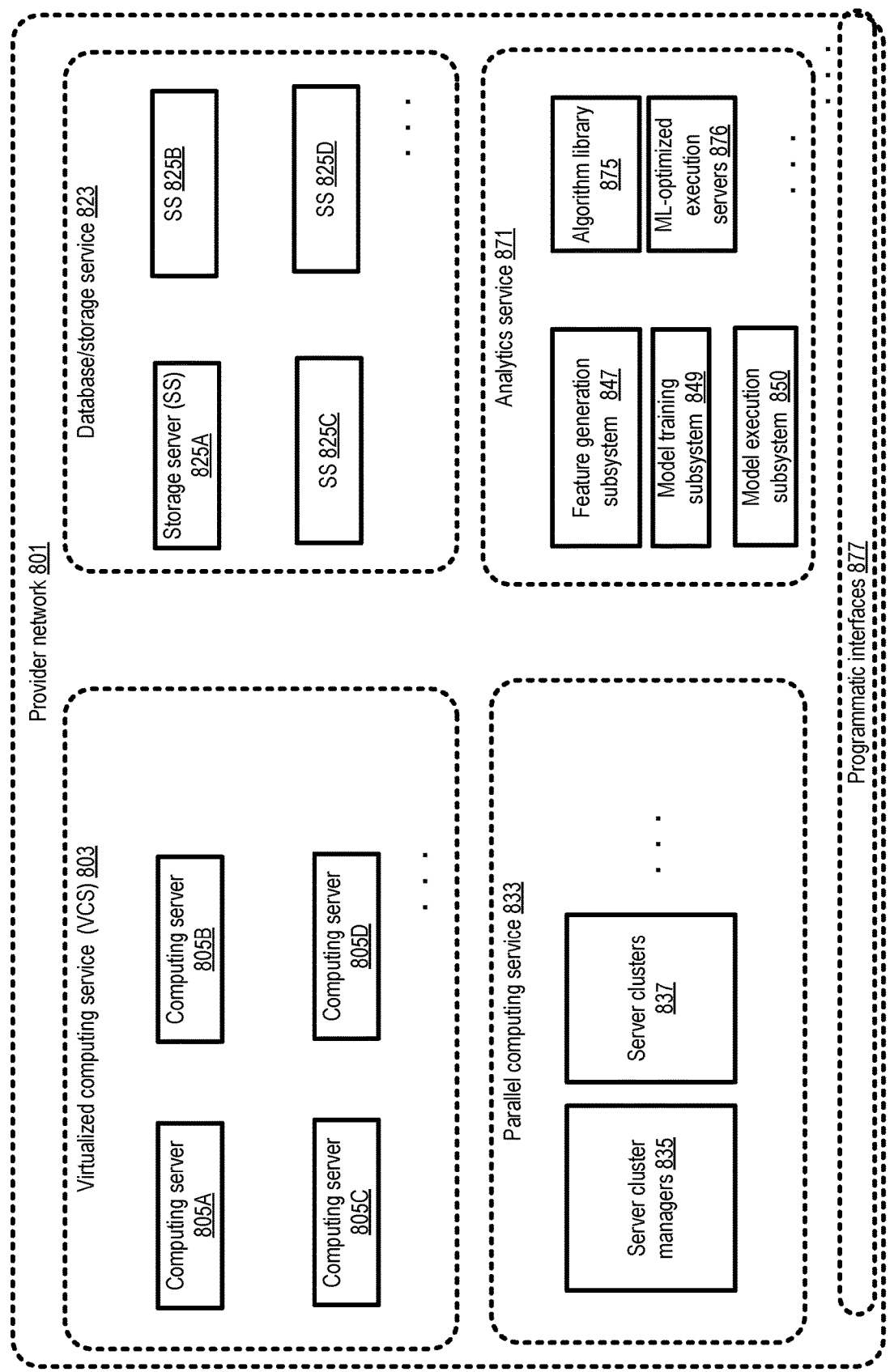
FIG. 8 illustrates an example provider network environment in which an analytics service supporting estimation of impacts of content presentation operations may be implemented, according to at least some embodiments.

In some embodiments, as mentioned earlier, an analytics service at which attribution analysis techniques similar to those described above are supported may be implemented at a provider network. FIG. 8 illustrates an example provider network environment in which an analytics service supporting estimation of impacts of content presentation operations may be implemented, according to at least some embodiments. In the depicted embodiment, provider network 801 may comprise resources used to implement a plurality of services, including for example a virtualized computing service (VCS) 803, a database/storage service 823, and a parallel computing service 833 as well as an analytics service 871 within which attribution analysis models may be developed and run. The analytics service 871, which may also be referred to as a machine learning service or an artificial intelligence service, in turn may comprise algorithm library 875, a feature generation subsystem 847 (at which features corresponding to interaction time series and users, similar to those discussed above, may be generated), model training subsystem 849 at which attribution models may be trained and re-trained using algorithms from library 875, model execution subsystem 850 at which the models may be executed, and machine learning-optimized execution servers 876 in the depicted embodiment. The parallel computing service 833 may include various server clusters 837, each comprising a plurality of servers, on which parallelizable workloads may be distributed by a set of server cluster managers 835 in the depicted embodiment. Some of the algorithms implemented at the analytics service 871 may be parallelizable, and may utilize the server clusters 837 in at least some embodiments. In at least some embodiments, the analytics service 871 may comprise an automated content presentation service similar to ACPS 103 of FIG. 1. In other embodiments a separate ACPS may also be implemented at provider network 801.

Components of a given service may utilize components of other services in the depicted embodiment—e.g., for some analytics service tasks, virtual machines implemented at computing servers such as 805A-805D of the virtualized computing service 803 may be used, server clusters 837 and/or cluster managers 835 may be utilized for parallelizable computations of the analytics service, input data and/or output produced at the analytics service may be stored at storage servers 825 (e.g., 825A-825D) of storage service 823, and so on. In some embodiments, a given application execution environment for which attribution analysis is performed may utilize resources of one or more of the network-accessible services of provider network 801—e.g., an application execution environment may include web servers established at some number of virtual machines run at computing servers 805 and use a database established at some number of storage servers 825. Each of the services may generate logs of user actions, which may serve as sources for the event records used in the attribution analysis procedures performed using analytics service 871 in such scenarios. Individual ones of the services shown in FIG. 8 may implement a respective set of programmatic interfaces 877 which can be used by external and/or internal clients (where the internal clients may comprise components of other services) in the depicted embodiment.

In some embodiments, at least some aspects of the attribution analysis techniques described herein may be implemented without acquiring resources of network-accessible services such as those shown in FIG. 8. For example, a standalone tool implemented at one or more computing devices which are not part of a network-accessible service may be used in one embodiment.

Methods for Data-Driven Attribution of Content Presentation Operations

Figure 9:
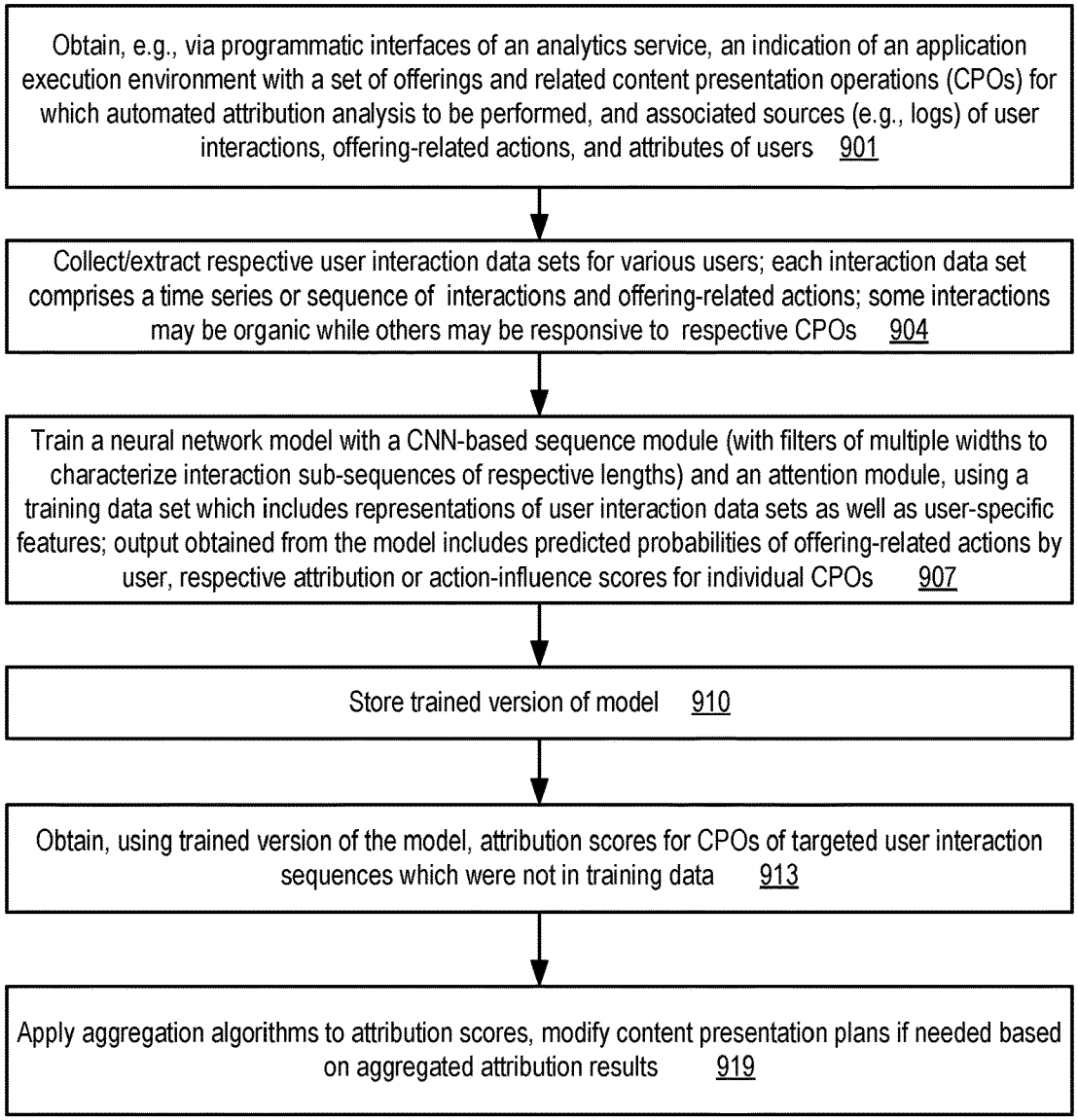
FIG. 9 is a flow diagram illustrating aspects of operations that may be performed to obtain and use estimates of the attribution of user actions to content presentation operations, according to at least some embodiments.

FIG. 9 is a flow diagram illustrating aspects of operations that may be performed to obtain and use estimates of the attribution of user actions to content presentation operations, according to at least some embodiments. As shown in element 901, an indication of an application execution environment (AEE) associated with a set of offerings and related content presentation operations (CPOs) for which automated data-driven attribution analysis is to be performed may be obtained, e.g., via programmatic interfaces of an analytics service similar to analytics service 102 of FIG. 1. The CPOs may be performed in accordance with one or more content presentation plans in different embodiments. Data about sources of interaction records (such as log records of various application components such as web sites which record HTTP and/or HTTPs requests of end users), sources of records of offering-related actions of end users, as well as sources of attributes of the end users may be obtained in at least some embodiments as part of the AEE information.

Respective user interaction data sets corresponding to individual users who have granted permissions to the analytics service for data collection and analysis may be extracted from the sources in various embodiments (element 904). A given user interaction sequence may comprise a time series or indexed sequence of interactions with application components in various embodiments. In at least some scenarios the final interaction of a given interaction of the sequence (or a plurality of interactions of the sequence) may represent the offering-related actions undertaken or initiated by the user. In at least one embodiment, the absence of a positive offering-related action (such as an absence of a purchase or absence of an indication that a user group has been joined by the end user) may be interpreted as a negative action. Explicit representations of such implied negative actions may be added to the end of the user interaction sequences in one embodiment. Some of the interactions of the user may be organic, while others may be responsive to respective CPOs in various embodiments.

Based on the extracted/collected interaction sequence information and the per-user attribute information, a training data set for a neural network-based machine learning model referred to as an attribution model may be generated in various embodiments. Preparation of the training data set may comprise, for example, generating respective per-interaction features (which differ from one interaction of a sequence to another), and a set of features of the individual users whose interaction sequence is provided as input and who have granted authorization for the analysis. The user features may remain unchanged for a given input interaction sequence in some embodiments, regardless of the number of interactions being analyzed. The attribution model may comprise a sequence module with a plurality of convolutional layers with filter stacks of different widths and depths in at least some embodiments, and an attention layer or module to which the output of the sequence module is provided as input. The attribution model may be trained (element 907) using the training data set. The output of the model corresponding to a given input interaction sequence of a given user may include, for example, predicted probabilities of initiation of an offering-related action by the user, action-influence or attribution scores corresponding to individual CPOs to which at least some of the user's interactions were responsive, the predicted timing of the predicted action, and/or other predicted metrics in various embodiments.

A trained version of the attribution model may be stored (element 910) in various embodiments. Using the trained version, attribution scores for CPOs of new user interaction sequence (which were not in the training data set) may be obtained (element 913). Various types of aggregation algorithms may be applied to the per-user-interaction-sequence attribution scores to compute overall scores associated with different communication channels used for CPOs in some embodiments (element 919). Content presentation plans which were used for the CPOs in the analyzed interaction sequences may be modified in at least some embodiments based on the model outputs and/or the results of the aggregation algorithms. As mentioned earlier, the model's outputs may be used to guide various aspects of future CPOs for one or more users in various embodiments, such as the timings or scheduling intervals of future CPOs, the particular channels to be used for respective future CPOs, and/or the specific type of content to be included in respective future CPOs.

It is noted that in various embodiments, some of the operations shown in the flow diagram of FIG. 9 may be implemented in a different order than that shown in the figure, or may be performed in parallel rather than sequentially. Additionally, some of the operations shown in FIG. 9 may not be required in one or more implementations.

Use Cases

The techniques described above, of using deep neural networks which include attention layers and convolutional layers to determine the relative impact of different content presentation operations on user actions pertaining to offerings accessible via applications may be extremely beneficial in a variety of scenarios. Substantial amounts of resources may be expended on content presentation operations by large organizations such as operators of Internet-scale online stores, which may have millions of offerings available and large amounts of content that could be presented to users about the offerings. Conventional techniques for determining the benefits of the different content presentation operations may be based on somewhat arbitrarily-determines heuristics, and hence may lead to sub-optimal allocations of content presentation resources. Using the data-driven approaches described herein may lead to a substantial reduction in resources consumed, while simultaneously increasing the benefits of content presentation.

Illustrative Computer System

Figure 10:
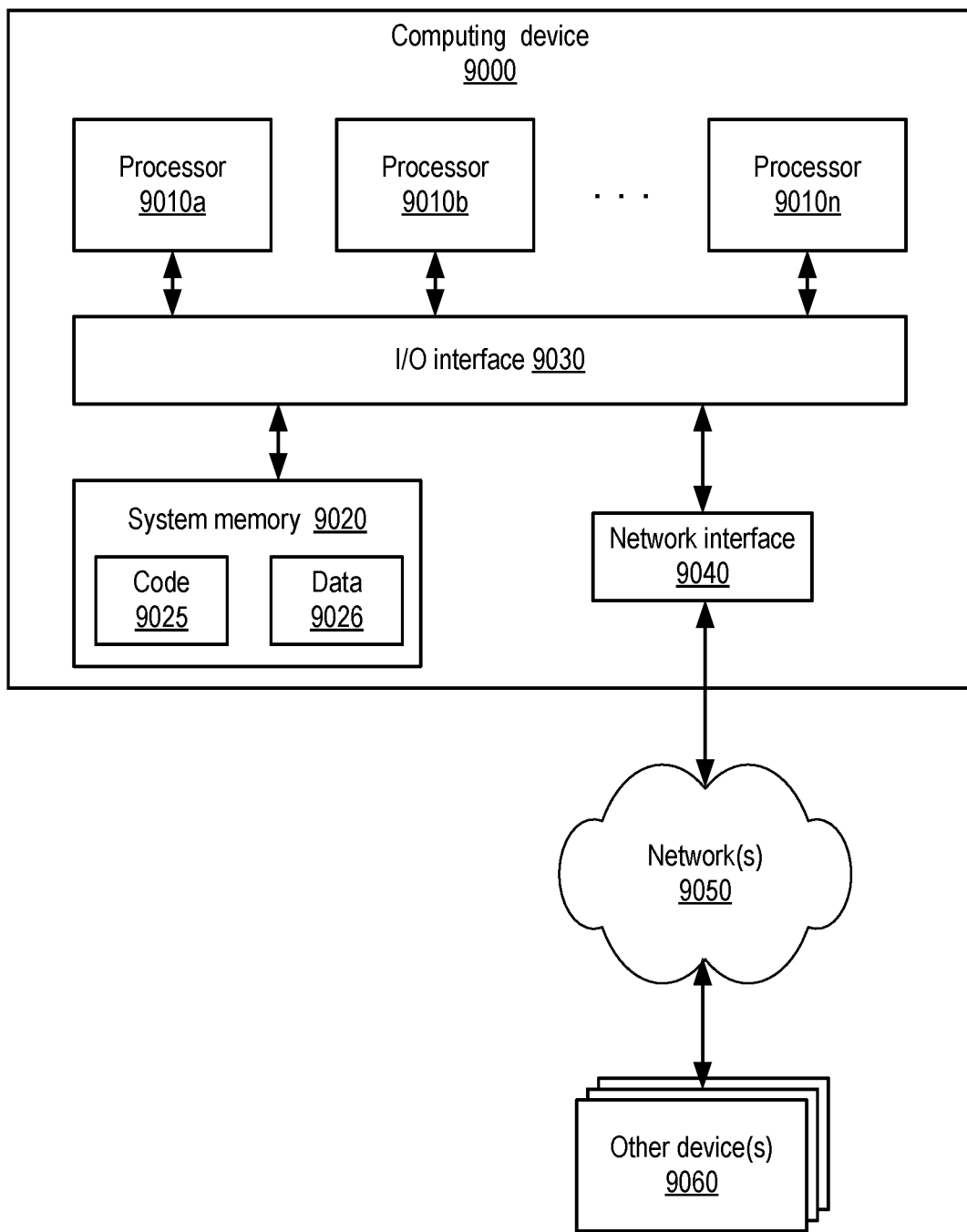
FIG. 10 is a block diagram illustrating an example computing device that may be used in at least some embodiments.

In at least some embodiments, a server that implements the types of techniques described herein (e.g., various functions of an analytics service or a content presentation service), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices comprising one or more processors and associated memory;
wherein the one or more computing devices include instructions that upon execution on or across the one or more computing devices cause the one or more computing devices to:
obtain respective user interaction data sets of a plurality of users of an application set comprising one or more applications associated with a set of offerings, wherein a user interaction data set of a particular user comprises (a) a time series of interactions of the particular user with the application set during a selected time interval, wherein at least a subset of the interactions of the particular user are responsive to respective content presentation operations directed at the particular user in accordance with a first content presentation plan and (b) a representation of one or more offering-related actions of the particular user after at least some interactions of the time series;
train, using a training data set which includes the respective user interaction data sets and a collection of user-specific features, a neural network-based machine learning model whose output comprises (a) a predicted probability of initiation of an offering-related action by a user at whom a plurality of content presentation operations are directed and (b) a respective estimated action-influence score associated with individual ones of the plurality of content presentation operations, wherein the neural network-based machine learning model comprises at least a sequence module and an attention module, wherein the sequence module comprises a plurality of one-dimensional convolutional layers, including a first one-dimensional convolution layer with a filter of a first length and a second one-dimensional convolution layer with a filter of a different length, wherein output of the sequence module is provided as input to the attention module, and wherein the respective estimated action-influence scores are based at least in part on one or more learned weights of the attention module;

store a trained version of the neural network-based machine learning model;

use the trained version of the neural network-based machine learning model to output a set of estimated action-influence scores associated with the individual ones of the plurality of content presentation operations; and modify, based at least in part on the set of estimated action-influence scores obtained based at least in part on the one or more learned weights of the attention module using the trained version of the neural network-based machine learning model, at least some planned content presentation operations directed at the particular user in the first content presentation plan.

2. The system as recited in claim 1, wherein the one or more computing devices include further instructions that upon execution on or across the one or more computing devices further cause the one or more computing devices to:

causing a representation of the estimated action-influence scores obtained using the trained version of the neural network-based machine learning model to be presented via a graphical user interface.

3. The system as recited in claim 1, wherein the one or more computing devices include further instructions that upon execution on or across the one or more computing devices further cause the one or more computing devices to:

estimate, using the trained version of the neural network-based machine learning model, a cumulative impact of a set of content presentation operations directed to a first user, wherein estimation of the cumulative impact comprises:

obtaining, by providing a first time series which includes a plurality of interactions of the first user as input to the trained version, a first prediction of a probability of a first offering-related action from the trained version, wherein individual ones of the plurality of interactions are responsive to respective content presentation operations of the set of content presentation operations;

obtaining, by providing a second time series which excludes the plurality of interactions of the first user as input to the trained version, a second prediction of a probability of the first offering-related action from the trained version; and computing a result of a function whose inputs include the first prediction and the second prediction; and provide, via one or more programmatic interfaces, an indication of the cumulative impact.

4. The system as recited in claim 1, wherein the training data set comprises, corresponding to a first interaction of the time series of interactions of the particular user, an indication of a communication channel used for a content presentation operation associated with the first interaction, wherein using the communication channel comprises using one or more of: (a) an e-mail application, (b) a web page link, (c) a social media service, (d) a text messaging application, (e) an automated personal assistant device, (f) a wearable device, or (g) a phone.

5. The system as recited in claim 1, wherein the training data set comprises, corresponding to a first interaction of the time series of interactions of the particular user, an indication of one or more of: (a) an operating system employed by the particular user for the first interaction, (b) a category of a program utilized by the particular user for the first interaction, selected from a set of categories comprising a mobile application, a web browser, or a host-based application, (c) an indication of a device type utilized by the particular user for the first interaction, or (d) one or more descriptors of content associated with the first interaction.

6. A computer-implemented method, comprising:

obtaining respective user interaction data sets of a plurality of users of an application, wherein a user interaction data set of a particular user comprises (a) a sequence of interactions of the particular user with the application, wherein at least a subset of the interactions of the particular user are associated with respective content presentation operations directed at the particular user and (b) a representation of one or more actions initiated by the particular user after at least some interactions of the sequence;

training, using a training data set comprising the respective user interaction data sets, a neural network-based machine learning model whose output comprises (a) a prediction of an action of a user at whom a plurality of content presentation operations are directed and (b) a respective estimated action-attribution score associated with individual ones of the plurality of content presentation operations, wherein the neural network-based machine learning model comprises at least a sequence module and an attention module, wherein the sequence module comprises one or more convolutional layers, wherein output of the sequence module is provided as input to the attention module, wherein the respective estimated action-attribution scores are based at least in part on one or more learned weights of the attention module;

use a trained version of the neural network-based machine learning model, with respect to a user interaction data set which is not represented in the training data set, to output a set of estimated action-attribution scores; and storing the set of estimated action-attribution scores obtained based at least in part on the one or more learned weights of the attention module using the trained version of the neural network-based machine learning model with respect to the user interaction data set which is not represented in the training data set.

7. The computer-implemented method as recited in claim 6, further comprising:

obtaining an indication of an objective with respect to a set of offerings associated with the application; and identifying, based at least in part on output obtained from the trained version of the neural network-based machine learning model, one or more content presentation operations to be implemented to achieve the objective.

8. The computer-implemented method as recited in claim 6, wherein the output of the neural network-based machine learning model comprises an estimated timing of a predicted action.

9. The computer-implemented method as recited in claim 6, further comprising:

determining, based at least in part on output obtained from the trained version of the neural network-based machine learning model, that after a particular future content presentation operation directed at a first user, a subsequent content presentation operation directed at the first user is to be implemented after a particular time interval.

10. The computer-implemented method as recited in claim 6, further comprising:
determining, based at least in part on output obtained from the trained version of the neural network-based machine learning model, that after a particular future content presentation operation is directed at a first user using a first communication channel, a subsequent content presentation operation directed at the first user is to be implemented using a second communication channel.

11. The computer-implemented method as recited in claim 6, further comprising:
determining, based at least in part on output obtained from the trained version of the neural network-based machine learning model, that after a particular set of content is presented in a future content presentation operation directed at a first user, a different set of content is to be presented in a subsequent content presentation operation directed at the first user.

12. The computer-implemented method as recited in claim 6, wherein the training data set comprises representations of one or more attributes of the particular user, including one or more of: (a) a membership status of the particular user within one or more user groups associated with the application, (b) an indication of how recently the particular user has interacted with one or more web sites associated with the application, (c) an indication of how frequently the particular user has interacted with one or more web sites associated with the application during a time period, (d) an indication of a total value of actions initiated by the particular user with respect to the application during a time period or (e) an indication of a duration for which the particular user has interacted with the application.

13. The computer-implemented method as recited in claim 6, wherein the one or more actions initiated by the particular user after at least some interactions of the sequence comprise one or more of: (a) a purchase of one or more items of a catalog associated with the application, (b) a subscription to a service or (c) becoming a member of a user group associated with the application.

14. The computer-implemented method as recited in claim 6, further comprising:
obtaining a training request via a programmatic interface of an analytics service of a provider network, wherein the training of the neural network-based machine learning model is response to the training request.

15. The computer-implemented method as recited in claim 6, wherein the one or more convolutional layers comprise a plurality of one-dimensional convolutional layers, including a first one-dimensional convolution layer with a filter of a first length, and a second one-dimensional convolution layer with a filter of a different length.

16. One or more non-transitory computer-accessible storage media storing program instructions that when executed on or across one or more processors cause the one or more processors to:
obtain respective interaction data sets of a plurality of consumers of an offering set, wherein an interaction data set of a particular consumer comprises (a) a sequence of interactions of the particular consumer with one or more applications associated with the offering set, wherein at least a subset of the interactions of the particular consumer are associated with respective content presentation operations directed at the particular consumer and (b) a representation of one or more actions initiated by the particular consumer after at least some interactions of the sequence;
train, using a training data set comprising the respective interaction data sets, a neural network-based machine learning model whose output comprises (a) a prediction of an action of a consumer at whom a plurality of content presentation operations are directed and (b) a respective estimated action-attribution score associated with individual ones of the plurality of content presentation operations, wherein the neural network-based machine learning model comprises at least a sequence module and an attention module, wherein the sequence module comprises one or more convolutional layers, wherein output of the sequence module is provided as input to the attention module, and wherein the respective estimated action-attribution scores are based at least in part on one or more learned weights of the attention module;
store a trained version of the neural network-based machine learning model; and
use the trained version of the neural network-based machine learning model to output a set of the estimated action-influence scores associated with the individual ones of the plurality of content presentation operations, wherein the set of the estimated action-attribution scores are based at least in part on the one or more learned weights of the attention module.

17. The one or more non-transitory computer-accessible storage media as recited in claim 16, storing further program instructions that when executed on or across the one or more processors further cause the one or more processors to:
cause a representation of an estimated action-attribution score obtained using the trained version of the model to be presented via a graphical user interface.

18. The one or more non-transitory computer-accessible storage media as recited in claim 16, storing further program instructions that when executed on or across the one or more processors further cause the one or more processors to:
estimate, using the trained version of the neural network-based machine learning model, a cumulative impact of a set of content presentation operations directed to a first consumer, wherein estimation of the cumulative impact comprises:
obtaining, by providing a first sequence of interactions of the first consumer as input to the trained version, a first prediction of a first action from the trained version, wherein the first sequence of interactions includes one or more interactions associated with respective content presentation operations of the set of content presentation operations;
obtaining, by providing as input to the trained version, a second sequence of interactions which excludes the one or more interactions associated with respective content presentation operations, a second prediction of a probability of the first action from the trained version; and
computing a result of a function whose inputs include the first prediction and the second prediction; and
provide, via one or more programmatic interfaces, an indication of the cumulative impact.

19. The one or more non-transitory computer-accessible storage media as recited in claim 16, storing further program instructions that when executed on or across the one or more processors further cause the one or more processors to:

obtain, via one or more programmatic interfaces, an indication of a time period for which at least one user's interaction data set is to be collected.

20. The one or more non-transitory computer-accessible storage media as recited in claim 16, storing further program instructions that when executed on or across the one or more processors further cause the one or more processors to:

obtain, via one or more programmatic interfaces, values of one or more hyper-parameters of the neural network-based machine learning model.

\* \* \* \* \*